United States Patent [19]

Krueger et al.

[11] 4,338,959
[45] Jul. 13, 1982

[54] DEVICE TO AUTOMATICALLY ADD A CONTROLLED AMOUNT OF CORROSION INHIBITOR IN AN ENGINE COOLING SYSTEM

[75] Inventors: Robert H. Krueger, Palatine; Robert R. Kelly, Hoffman Estates; Rudolf M. Hempel, Palatine, all of Ill.; Bruce P. Miglin, Columbus, Ohio

[73] Assignee: Borg-Warner Corporation, Chicago, Ill.

[21] Appl. No.: 201,859

[22] Filed: Oct. 29, 1980

[51] Int. Cl.³ ............................................. F28F 19/00
[52] U.S. Cl. ......................................... 137/93; 23/230 C; 123/41.15; 123/198 R; 165/11 R; 165/13; 165/134 R; 204/1 T; 208/47; 222/52; 222/54; 422/53
[58] Field of Search ............ 165/11 R, 12, 13, 134 R; 62/85; 208/47; 222/52, 54, 57; 137/93; 123/198 R, 41.15; 23/230 C; 422/53; 204/1 T

[56] References Cited

U.S. PATENT DOCUMENTS

| | | | |
|---|---|---|---|
| 2,696,083 | 12/1954 | Eddy | 222/54 |
| 3,095,121 | 6/1963 | Douty et al. | 222/52 |
| 3,116,977 | 1/1964 | Grabowski et al. | 422/53 X |
| 3,207,365 | 9/1965 | Burford et al. | 222/54 X |
| 3,275,533 | 9/1966 | Boronkay | 204/1 T |
| 3,385,474 | 5/1968 | Roby, Jr. | 222/57 |
| 3,585,809 | 6/1971 | Brown | 165/11 R |
| 3,592,358 | 7/1971 | Lugsdin | 222/54 |
| 3,804,297 | 4/1974 | Jurjans | 222/54 |
| 3,809,150 | 5/1974 | Holmes | 165/134 R X |
| 3,815,620 | 6/1974 | Dziomba et al. | 137/93 |
| 3,976,121 | 8/1976 | Johnson | 165/11 R |
| 4,008,755 | 2/1977 | Vandamme | 165/11 R |
| 4,098,662 | 7/1978 | Schell et al. | 165/11 R |
| 4,130,098 | 12/1978 | Linder et al. | 123/198 R |
| 4,147,596 | 4/1979 | Baboian et al. | 123/41.15 |

FOREIGN PATENT DOCUMENTS 505888 10/1976 U.S.S.R. ............................ 222/54

Primary Examiner—Sheldon J. Richter
Attorney, Agent, or Firm—James A. Geppert

[57] ABSTRACT

Means for adding corrosion inhibitor to an engine cooling system utilizing a corrosion detector in contact with the circulating coolant and which is in an electronic circuit to activate a control valve which controls the feeding of corrosion inhibitor solution from a reservoir that is in selective communication with the coolant system. The corrosion detector may be in the form of a probe that measures solution potential or electrical resistance of a metal wire as it corrodes due to the corrosiveness of the coolant. The corrosion inhibitor reservoir is located either in communication with the line between the radiator and coolant reservoir or in a bypass line parallel with the radiator.

12 Claims, 4 Drawing Figures

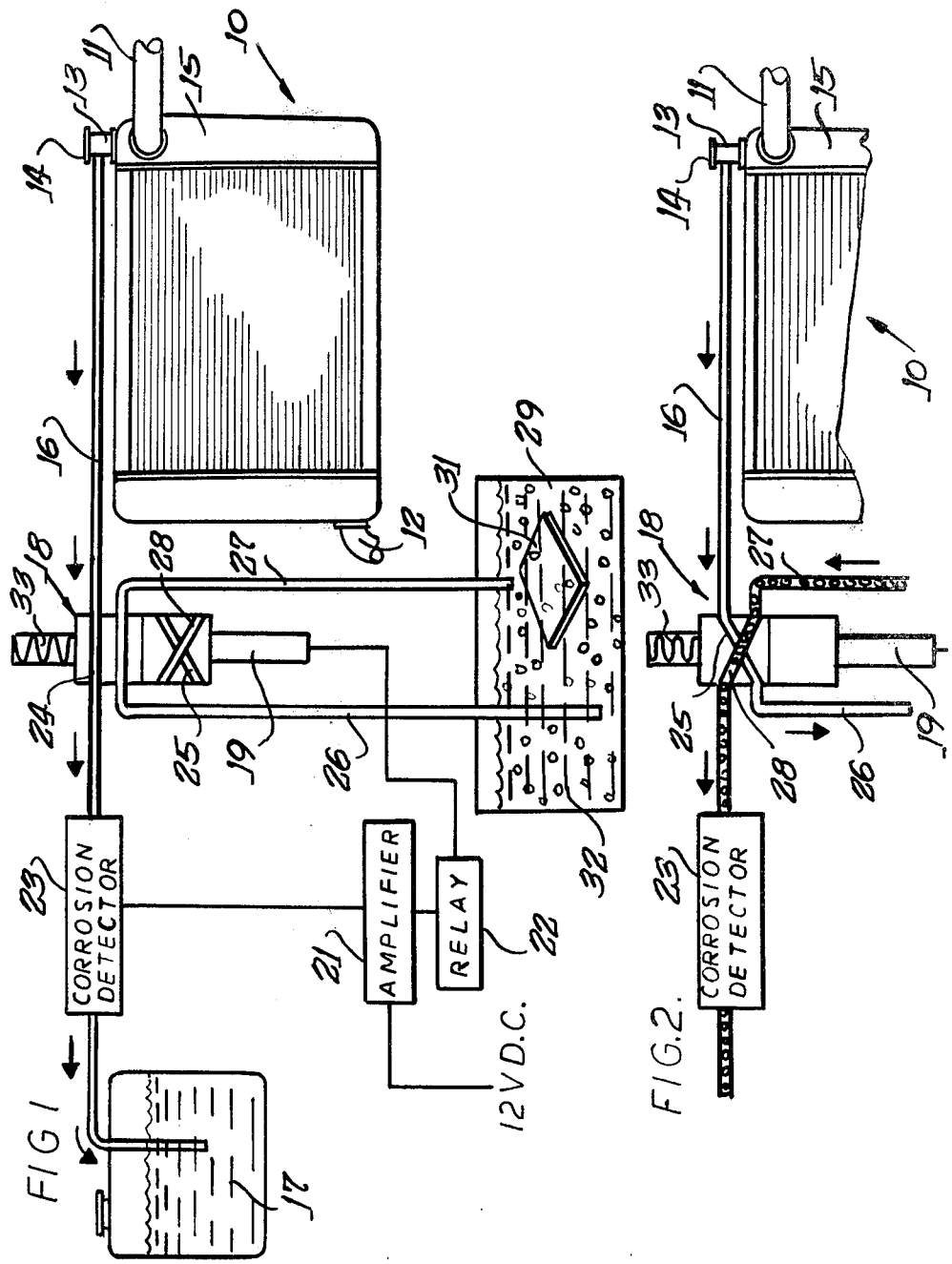

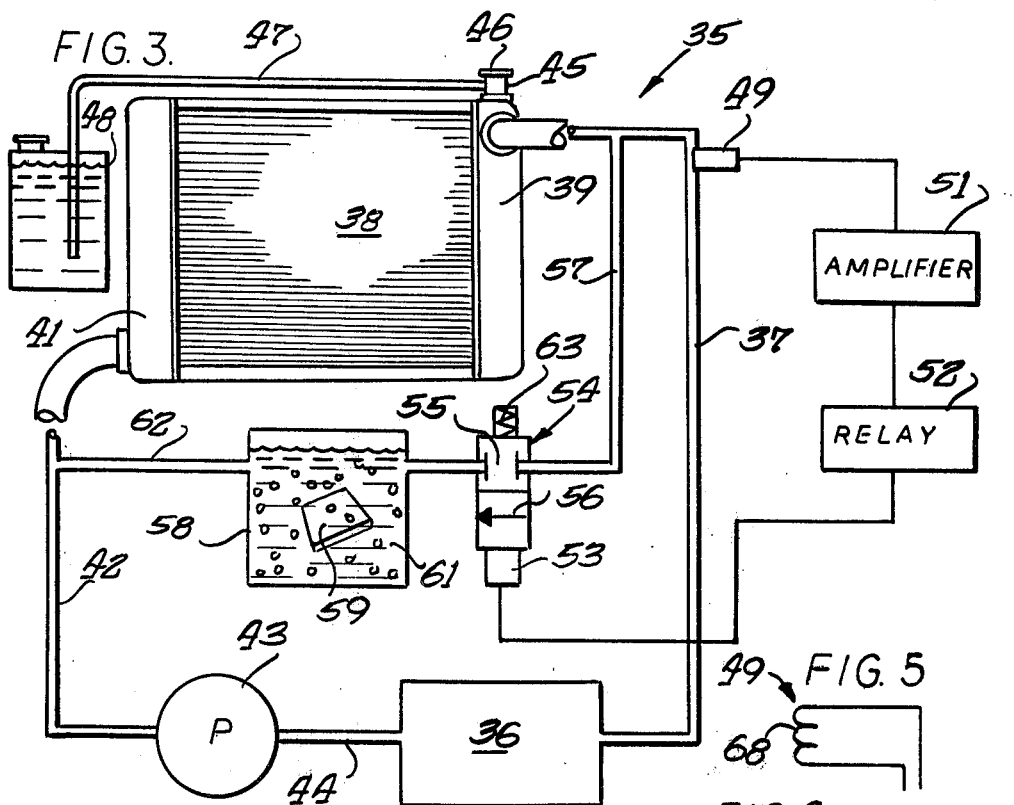
FIG. 3.
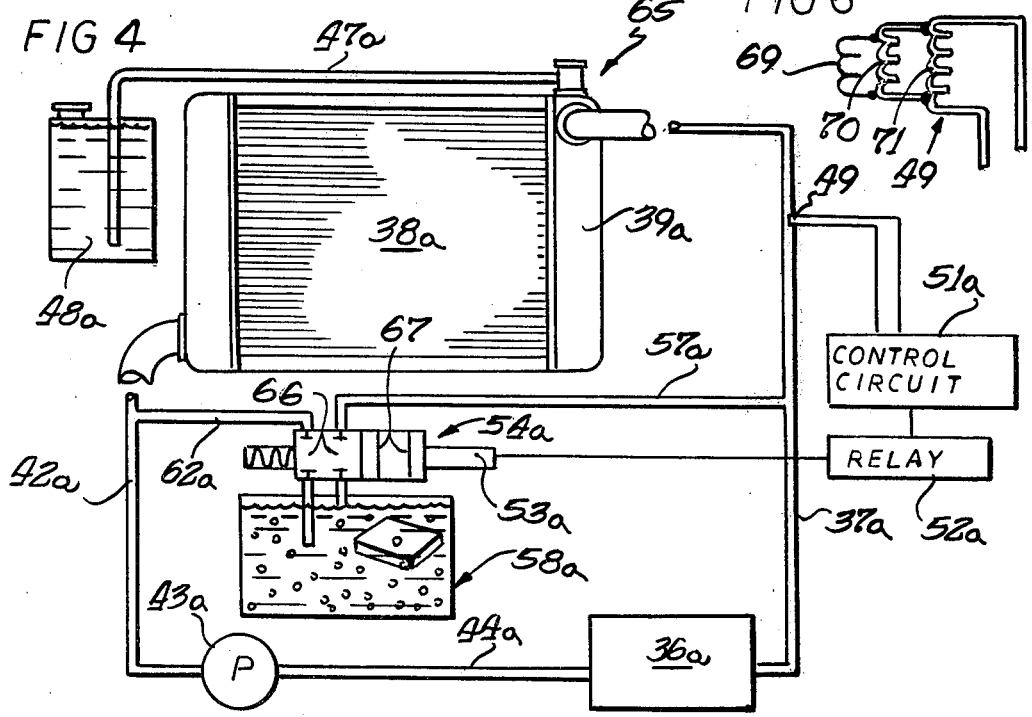
FIG 4
FIG 5
FIG 6

DEVICE TO AUTOMATICALLY ADD A CONTROLLED AMOUNT OF CORROSION INHIBITOR IN AN ENGINE COOLING SYSTEM

BACKGROUND OF THE INVENTION

Engine coolants for automotive vehicles usually contain a solution of ethylene glycol and a small percentage of diethylene glycol diluted with water to make an approximately 50-50 mixture or lower depending on the desired freezing point for the solution. Most companies which manufacture or distribute ethylene glycol add a corrosion inhibitor to the solution to protect the metal components of the system; especially the radiator. These inhibitors are usually a mixture of one or more inorganic salts, such as phosphates, borates, nitrates, nitrites, silicates or arsenates, and an organic compound, such as benzotriazole, tolyltriazole or mercaptobenzothiazole. The solution is generally buffered to a pH of 8 to 10 to reduce iron corrosion and to neutralize any glycolic acid formed in the oxidation of ethylene glycol.

As the number of automobiles requiring coolant system servicing rises to 50% after two years of normal passenger car service, it is extremely important that the coolant mixture contain 50 to 55% of properly inhibited ethylene glycol to prevent corrosion of conventional copper-brass radiators. With the advent of aluminum radiators which are more susceptible to corrosion than copper-brass units, the use of a proper amount of corrosion inhibitor in the coolant solution becomes more critical. A reduction of the coolant mixture to 33% ethylene glycol and 67% water will increase metal corrosion significantly; especially in higher temperature coolant systems which are becoming more common with the increased use of emission controls.

To prevent corrosion, the inhibitor concentration must be maintained at a proper level to prevent corrosion problems occurring if the coolant is lost through leakage or boil-off or if the inhibitor efficiency decreases with age. To solve the problem, the inhibitor concentration must be correctly measured and additional inhibitor added when needed. The present invention provides a device to overcome the above problems.

SUMMARY OF THE INVENTION

The present invention comprehends the provision of a device for the automatic addition of corrosion inhibitor to a cooling system including an electronic control circuit having a probe or sensor which indicates instantaneous corrosion rates in an engine cooling system and provides a signal to a solenoid activating a control valve which automatically adds a controlled amount of corrosion inhibitor solution to the cooling system.

The present invention also comprehends the provision of a device for automatic addition of a corrosion inhibitor to an automotive cooling system where a corrosion inhibitor reservoir is connected into the line extending between the radiator and the coolant overflow reservoir. A spring-biased control valve is actuated by a solenoid which, under normal conditions connects the radiator directly to the overflow reservoir. When activated by detection of excess corrosion in the cooling system, the valve shifts so that fluid in the overflow conduit is diverted to the inhibitor reservoir to force inhibitor solution into the conduit past the corrosion sensor to the overflow reservoir.

The present invention further comprehends the provision of a device for the automatic addition of corrosion inhibitor to an engine cooling system wherein a corrosion inhibitor reservoir is connected in parallel with the radiator in a radiator by-pass line in the coolant circulating system and is controlled by an electrically-actuated solenoid valve. When the solenoid valve opens due to a signal from a suitable sensor, the pressure drop due to the radiator forces corrosion inhibitor solution into the coolant over a prescribed time interval, and the control circuit then signals the solenoid valve to close.

The present invention also relates to a novel control system utilizing a solution potential probe to sense and indicate when the corrosiveness of the cooling solution increases and provide a signal for the control circuit activating the solenoid valve.

The present invention further relates to a novel control system using a corrosion sensor in the form of a corrodible wire that will change in resistance as corrosion progresses. At a prescribed resistance level or when the wire breaks to form an open circuit, a signal is conveyed to the control circuit to activate the solenoid-operated valve to add a predetermined quantity of corrosion inhibitor solution to the coolant.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a schematic view of the radiator and overflow reservoir for a vehicle cooling system employing the present invention.

FIG. 2 is a partial schematic view similar to FIG. 1 but showing the control valve in the inhibitor addition position.

FIG. 3 is a schematic view of a vehicle cooling system with an alternate embodiment of corrosion inhibitor control system.

FIG. 4 is a schematic view of a vehicle cooling system with a third embodiment of corrosion inhibitor control system.

FIG. 5 is a partial schematic view of a corrosion sensor used in the embodiments of FIGS. 3 or 4.

FIG. 6 is a partial schematic view of an alternate form of corrosion sensor.

DESCRIPTION OF THE PREFERRED EMBODIMENTS

Referring more particularly to the disclosure in the drawings wherein are shown illustrative embodiments of the present invention, FIG. 1 discloses a portion of the cooling system for an automotive vehicle including a radiator 10 having an inlet 11 for hot coolant from the vehicle engine jacket and an outlet 12 leading to a coolant pump for the engine, a pressure relief and vent cap 14 on a filler neck 13 for the inlet tank 15 of the radiator, and an overflow line 16 leading from the vent cap to an overflow reservoir 17 for the coolant.

Interposed in the overflow conduit 16 is a springbiased control valve 18 which is actuated through a solenoid 19 in an electric circuit including an amplifier 21 and a relay 22. To provide a signal to the amplifier, a suitable corrosion detector 23 is located in the conduit 16 to measure the corrosiveness of the coolant passing through the conduit between the radiator 10 and the overflow reservoir 17. One such detector for this function is a solution potential probe manufactured by Texas Instruments Incorporated as shown in U.S. Pat. No. 4,147,596.

The control valve 18 has two positions, with the first position in FIG. 1 having a connection or passage 24 for direct flow through the conduit 16, while a second position in FIG. 2 shows a first passage 25 leading from the radiator side of conduit 16 to a corrosion inhibitor reservoir 29 through line 26 and a return line 27 from the reservoir connects with a second valve passage 28 leading to the overflow reservoir side of conduit 16. The reservoir contains a quantity of solid corrosion inhibitor in the form of pellets or block 31 and corrosion inhibitor solution 32 resulting from dissolution of the pellets or block by liquid fed to this reservoir.

Electric power is applied to the amplifier 21, relay 22 and probe 23 when the vehicle ignition switch is turned on. The control valve is biased to a flow through position by a spring 33 as shown in FIG. 1 to normally connect the radiator 10 to the overflow reservoir 17 through the port 24. As the vehicle engine warms up from a cold start, the coolant is warmed in the engine cooling jacket and expands and passes from the radiator 10 past the corrosion detection probe 23 in conduit 16 to the overflow reservoir 17. If the probe senses excess corrosion in the coolant, a signal from the probe activates the relay 22 through the amplifier 21 to energize the solenoid 19.

The solenoid shifts the control valve 18 against the force of spring 33 from the position of FIG. 1 to the position shown in FIG. 2, so that coolant flow enters the inhibitor reservoir 29 and dissolves a quantity of the inhibitor pellets 31 with a quantity of inhibitor solution 32 being carried through the valve past the probe 23 and into the overflow reservoir 17. The inhibitor solution passing the probe signals the solenoid for the control valve to return to normal position to stop further flow of inhibitor solution to the conduit 16. This cycle continues until the engine is completely warmed. After the engine is shut off and cools, the inhibitor solution is drawn back into the radiator from the overflow reservoir 17 where it acts to prevent corrosion in the radiator and engine. The next time the engine is started and warmed up, another quantity of corrosion inhibitor may be added, if necessary, using the same cycle until the coolant becomes non-corrosive.

FIG. 3 discloses an alternate arrangement of a corrosion inhibitor addition system for a vehicle cooling system 35 including an engine 36 or other heat source having a cooling jacket, a hot fluid conduit 37 from the engine to the inlet tank 39 of a radiator 38, a cooled fluid conduit 42 from the outlet tank 41 leading to a fluid pump 43 operated by the engine to pump the coolant through a conduit 44 to the cooling jacket. A filler neck 45 on the inlet header 39 has a pressure relief cap 46 and an overflow conduit 47 leads from the neck to the overflow reservoir 48.

A corrosion sensor 49 is positioned in the conduit 37 and is connected in an electric circuit including an amplifier 51, a relay 52 and a solenoid 53 to activate a spring-biased control valve 54. The control valve has a movable valve member with one position having a blocked port 55 and a second position with an open port 56. A by-pass conduit 57 extends from the conduit 37 adjacent the inlet tank 39 through the control valve 54 to a corrosion inhibitor reservoir 58 containing inhibitor pellets or blocks 59 and inhibitor solution 61. A feeder conduit 62 leads from the reservoir 58 to the fluid conduit 42 between the outlet tank 41 and pump 43; the conduits 57 and 62 and reservoir 58 providing a pathway in parallel with the radiator.

In this embodiment, the valve 54 is normally closed by the spring 63 as the non-corrosive coolant circulates the fluid pump 43 through the cooling jacket of the engine 36, the conduit 37 past the sensor 49, radiator 38 and conduit 42. If the coolant becomes corrosive, a signal from the sensor 49 actuates the solenoid 53 to open the valve 54 and allow a small portion of the coolant to circulate through the corrosion inhibitor reservoir 58 and force corrosion inhibitor solution 61 through conduit 62 into the radiator output line 42 due to the higher pressure at the radiator input header 39. When sufficient corrosion inhibitor has been circulated, the sensor 49 signals the control valve to close and normal operation continues.

FIG. 4 discloses a third embodiment of cooling system 65 similar to FIG. 3 with like parts having the same reference numeral with a script a. In this version the conduit 57a intersects radiator input conduit 37a at a location removed from the radiator inlet tank 39a, and the control valve 54a has a spring-biased reciprocable valve member with a pair of closed ports 66,66 and a pair of open ports 67,67. This embodiment operates substantially like FIG. 3, except when the valve 54a is actuated, the by-pass line 57a communicates with the inhibitor reservoir 58a through one port 67 and the other port 67 allows flow through conduit 62a, and the pressure drop due to the radiator or other orifice means forces corrosion inhibitor solution into the coolant for a predetermined time interval. Then the control circuit signals the valve 54a to close.

FIG. 5 discloses an alternate type of sensor 49 for the control circuit consisting of an aluminum wire 68 which changes in resistance as the wire corrodes. Thus, when the coolant becomes corrosive, the wire 68 corrodes increasing the wire resistance to a predetermined level to signal the control circuit, or the circuit could receive the signal when the wire breaks due to corrosion to form an open circuit. The rate of corrosion can be regulated by using wires of different aluminum alloys. Corrosion may also be adjusted by (1) variation in wire thickness; (2) variation in wire location to vary fluid velocity or temperature; (3) variation in wire design to form crevices, galvanic or stress corrosion; and (4) use of multiple wires.

FIG. 6 illustrates a sensor 49 using multiple wires 69,70 and 71 which may be of various thicknesses or alloy composition, such that corrosion of all wires is at the same rate with breakage of the thinnest wire activating the circuit. Later breakage of the second and third wires will again signal the control circuit to cascade corrosion inhibitor injections as required.

We claim:

1. A control system for the automatic addition of a chemical additive to a solution requiring treatment, comprising a circulating fluid system for the solution requiring treatment, a sensor inserted in the system in contact with the fluid to determine the level of treating chemical therein and issue a signal when the level decreases below a predetermined value, the improvement comprising a closed chemical treating solution reservoir containing solid treating chemical to be dissolved and chemical treating solution, a control valve controlling liquid flow from said fluid system to said reservoir for positive displacement of treating solution from said reservoir to said system and an inlet and an outlet for said reservoir in communication with the circulating fluid system, a solenoid to actuate said valve, and an electric circuit receiving the signal from the sensor and actuating said solenoid.

2. A control system as set forth in claim 1, in which said sensor is a solution potential probe.

3. A control system as set forth in claim 1, in which said sensor is at least one corrodible wire that changes resistance as it corrodes in the untreated fluid.

4. A control system as set forth in claim 3, in which several corrodible wires are positioned in parallel and vary in thickness so that they will corrode and break at different time intervals.

5. A control system for the automatic addition of a chemical additive to a solution requiring treatment, comprising a circulating fluid system for the solution requiring treatment wherein the fluid system is the cooling system for an automotive vehicle including a radiator, a fluid pump, and a cooling jacket for the vehicle engine, a sensor inserted in the system in contact with the fluid to determine the level of treating chemical therein and issue a signal when the level decreases below a predetermined value, said treating chemical being a corrosion inhibitor in the circulating coolant, the improvement comprising a chemical treating solution reservoir containing solid treating chemical to be dissolved and chemical treating solution, a control valve controlling liquid flow to said reservoir and an inlet and an outlet for said reservoir in communication with the circulating system, a solenoid to actuate said valve, and an electric circuit receiving the signal from the sensor and actuating said solenoid.

6. A control system as set forth in Claim 5, in which the circulating fluid system includes an overflow reservoir connected to the radiator by an overflow conduit, said sensor and said control valve being positioned in the overflow conduit, said inlet and outlet for said reservoir passing through said valve.

7. A control system as set forth in claim 6, in which said control valve is a two-position valve allowing direct flow through said conduit in one position and directing all flow from the conduit to the overflow reservoir through the corrosion inhibitor reservoir in the other position.

8. A control system as set forth in claim 5, in which said electric circuit includes an amplifier receiving the signal from said sensor, a relay receiving the signal from the amplifier and actuating said solenoid for the control valve.

9. A control system as set forth in claim 5, in which said sensor is located in a conduit leading from the cooling jacket to the radiator inlet, an inlet for said corrosion inhibitor reservoir communicates with the first mentioned conduit adjacent the radiator inlet and passes through the control valve, and the reservoir outlet communicates with the radiator outlet conduit.

10. A control system as set forth in claim 9, in which said control valve is a two-position valve with a first position blocking flow through the reservoir inlet and the second position allowing flow through the inlet.

11. A control system as set forth in claim 5, in which said sensor is located in the radiator inlet conduit, an inlet for said corrosion inhibitor reservoir communicates with said radiator inlet conduit at a point spaced upstream from the radiator, and an outlet for said reservoir communicates with said radiator outlet conduit, said reservoir inlet and outlet passing through said control valve.

12. A control system as set forth in claim 11, in which said control valve is a two-position valve blocking said reservoir inlet and outlet in one position and having a pair of ports allowing flow into and out of said reservoir in the second position.

* * * * *